Aug. 4, 1964   H. METTE ETAL   3,143,448
PHOTOMAGNETOELECTRIC CELL AND METHOD
Filed Feb. 21, 1962
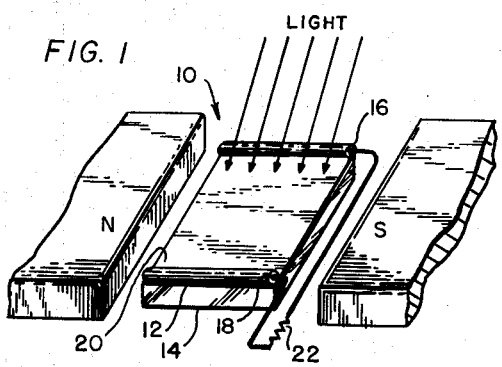
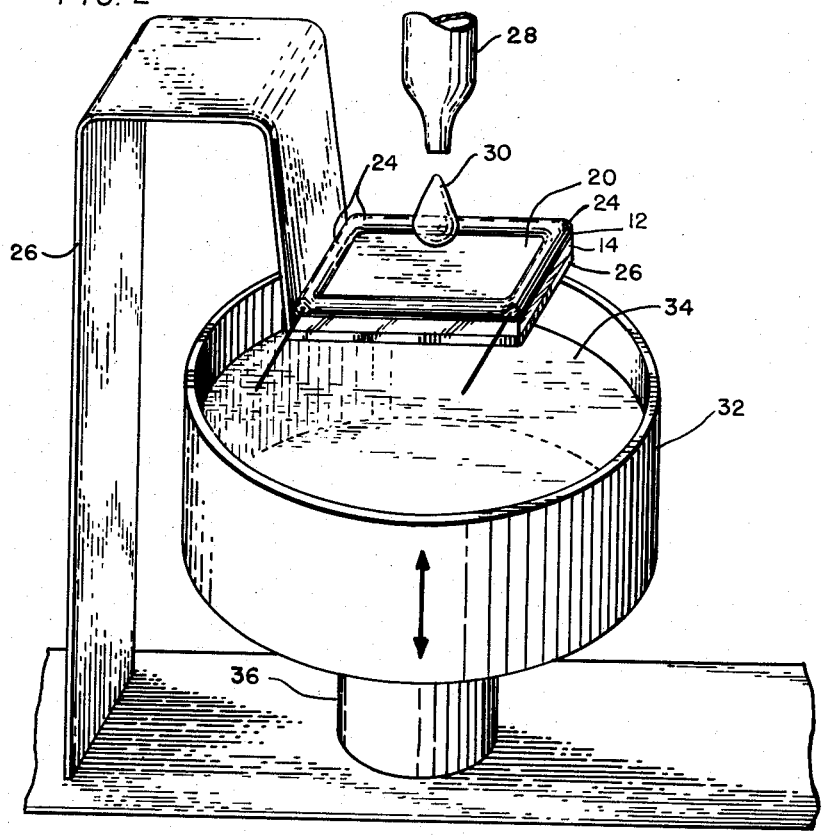
INVENTORS,
HERBERT METTE &
ARTHUR BOATRIGHT.
BY Jack H. Linscott
ATTORNEY.

United States Patent Office 3,143,448
Patented Aug. 4, 1964

3,143,448
PHOTOMAGNETOELECTRIC CELL AND
METHOD
Herbert Mette, Neptune, and Arthur Boatright, Asbury
Park, N.J., assignors to the United States of America
as represented by the Secretary of the Army
Filed Feb. 21, 1962, Ser. No. 174,922
2 Claims. (Cl. 156—17)
(Granted under Title 35, U.S. Code (1952), sec. 266)

The invention described herein may be manufactured and used by or for the Government for governmental purposes without the payment of any royalty thereon.

This invention relates to photoelectricity and more particularly to photomagnetoelectric effects.

Photomagnetoelectric (PME) effects heretofore known, are defined as a phenomenon which occurs when a slab of semiconducting material, illuminated on one of its faces, is placed in a magnetic field perpendicular to the direction of illumination, so that a voltage is produced at right angles to both field and illumination. This voltage results from the accumulation at opposite sides of the slab of the electrons and holes generated by the light at the surface which are deflected in opposite directions by the magnetic field as they diffuse into the slab.

It has recently been proposed to utilize the photomagnetoelectric effect in etched thin single crystal semiconductor layers for the detection of optical maser signals. While PME cells made with thin films have a much wider spectral coverage than photocells previously available, their use is limited due to their low output voltages and long response times.

It has been found that to achieve a high output voltage and a short response time for etched single crystal semiconductor layers, utilized as PME cells, the following two conditions should prevail:

(1) A low front surface recombination velocity on the layer characterized by a very smooth surface condition free of surface traps such as oxides and other impurities; and (2) A layer of semiconductor material not more than 10 microns in thickness.

It is an object of the present invention to provide a new and improved photomagnetoelectric cell suitable for use as an optical maser detector.

It is another object of the invention to provide a method of sensitizing the exposed surface of such novel photomagnetoelectric cell.

In accordance with the present invention a cell is formed which consistently produces the desired photomagnetoelectric voltage in response to very short light pulses. The PME cell comprises an etched single crystal semiconductor layer not more than 10 microns in thickness and characterized by an exposed surface having a large area and a low surface recombination velocity so that its response time is less than one microsecond.

For a more detailed description of the invention together with other and further objets thereof, reference is had to the following description, taken in connection with the accompanying drawing, in which:

FIG. 1 is a perspective view of a photomagnetoelectric cell in accordance with the invention; and FIG. 2 illustrates the arrangement utilized in carrying out the method of the present invention.

Referring to FIG. 1, there is shown a photomagnetoelectric cell 10 of the invention which comprises an n-type germanium layer 12 mounted on a glass plate 14. Copper leads 16 and 18 are soldered to the exposed surface 20 of layer 12 and make ohmic contact with the exposed surface.

A PME device can be constructed by positioning cell 10 between the poles N and S of a permanent magnet. The power generated in the device by incident light on surface 20 is consumed by an electrical load resistance 22 whose terminals are connected by leads 16 and 18 to layer 12.

One example of an embodiment like that of FIG. 1 is as follows: Thickness of layer 12 was 6 microns, and the exposed surface area 20 was approximately 1 square centimeter. When cell 10 was utilized as a PME device, an output voltage of 2 volts was produced and the response time was less than one microsecond for all wavelengths up to 6943 angstrom units.

In order to explain the significance of the method of sensitizing the exposed surface of the PME cell of FIG. 1, the conventional preparation of a thin layer of semiconductor material first will be described.

A semiconductor layer similar to the layer 12 of FIG. 1 is cut to approximately 1 square centimeter and lapped to about 6 mil thickness. This layer may be, for example, of 1.5 ohm-cm. material of n-type germanium. Copper leads 16 and 18 are soldered to opposite ends of layer 12, and the layer is mounted with an alkali resistant plastic base wax on glass slide 14 to maintain a high back surface recombination velocity. Leads 16 and 18 are masked and layer 12 is subjected to a conventional photoetching process that continues until layer 12 is approximately 6 microns in thickness.

After completion of the photoetching process the layer is rinsed with distilled water. If cell 10 were now to be placed between the poles of a permanent magnet and illuminated, it would not produce a high enough PME voltage nor would its speed of response be sufficient for it to be used as an optical maser detector. It was found that this insufficient PME output could be enhanced to the desired amount by an additional chemical etching of the front surface 20 of the layer 12. Hitherto, chemical etching a semiconductor layer having a thickness of about 6 microns has been extremely difficult to achieve. When the thin layer of semiconductor material was chemical etched by conventional techniques, the etchant tended to bite into the layer from the sides, break through the exposed surface and cause etch pits and holes, and thus reduce the sensitivity of the layer to an efficiency below the desired value, and in many cases destroy the layer itself. The following arrangement, which comprises the method of this invention, has overcome all of these difficulties, and describes means for producing an exposed layer surface with a low surface recombination velocity.

As shown in FIG. 2, the perimeter of the exposed photoetched surface 20 of cell 10 is first lined with a masking wax to form a shallow tray having raised rims 24. Cell 10 is then mounted on a support 26, which positions the cell beneath a burette 28 which releases CP4 etchant 30, diluted with distilled water to ½ strength, into the tray formed by rims 24 until the etchant completely covers exposed surface 20. CP4 etching mixture is well known and consists of equal parts of concentrated hydrofluoric and glacial acetic acids; about 1.5 parts of concentrated nitric acid for each previous part; and a few drops of liquid bromide for each 50 cu. cm. of the etchant. A beaker 32, containing distilled water 34, is positioned below the supported cell 10 on a movable piston 36. Beaker 32 can be raised and lowered so that cell 10 can be completely immersed in distilled water and rinse surface 20 when the beaker is in the raised position. The surface 20 is submerged in the distilled water in beaker 32 within a period not more than one second after the application of the diluted etchant. Repeated trials of this technique has shown that optimum PME sensitivity is reached after two to three such etching and rinsing cycles. These etching and rinsing cycles are believed to remove only an infinitesimal quantity of material from the exposed surface of layer 20 and no further improvement to the surface can be had by any additional rinsing and etching cycles. Surface 20 is then cleaned with alcohol and cell 10 is ready for use.

While there has been described what is at present considered a preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. The method of sensitizing the exposed surface of a thin layer of n-type germanium semiconductor material not more than 10 microns in thickness to produce a photomagnetoelectric cell comprising the steps of lining the perimeter of said exposed surface with a masking wax to form a shallow tray having raised rims, releasing a drop-wise mixture of CP4 etchant diluted with distilled water to ½ strength into said tray until the diluted CP4 etchant completely covers said exposed surface, said CP4 etchant comprising a solution of equal parts of concentrated hydrofluoric and glacial acetic acids, about 1.5 parts of concentrated nitric acid for each previous part, and a few drops of liquid bromide for each 50 cu. cm. of the etchant, and rapidly rinsing said diluted CP4 etchant from said exposed surface by completely immersing said exposed surface in distilled water within a period not more than one second after the application of said etchant on said exposed surface.

2. A sensitized thin layer of n-type germanium semiconductor material made in accordance with the process of claim 1.

References Cited in the file of this patent

UNITED STATES PATENTS

| | | |
|---|---|---|
| 2,827,367 | Cox | Mar. 18, 1958 |
| 2,871,110 | Stead | Jan. 27, 1959 |
| 2,890,159 | Amaya | June 9, 1959 |
| 3,051,840 | Davis | Aug. 28, 1962 |
| 3,063,886 | Remeika | Nov. 13, 1962 |
| 3,064,132 | Strull | Nov. 13, 1962 |

OTHER REFERENCES

New Intermetallics Offer, Nicolosi et al., Electronics Engineering Edition, vol. 31, No. 27, July 4, 1958, pp. 48–51

Photoconductive and Photoelectromagnetic Effects of InSb, Kurnick et al., Journal of Applied Physics, vol. 27, No. 3, March 1956, pp. 278–285.